May 20, 1924.
J. D. JONES ET AL
SLASHER CYLINDER HEAT REGULATING MEANS
Filed April 23, 1923
1,494,603
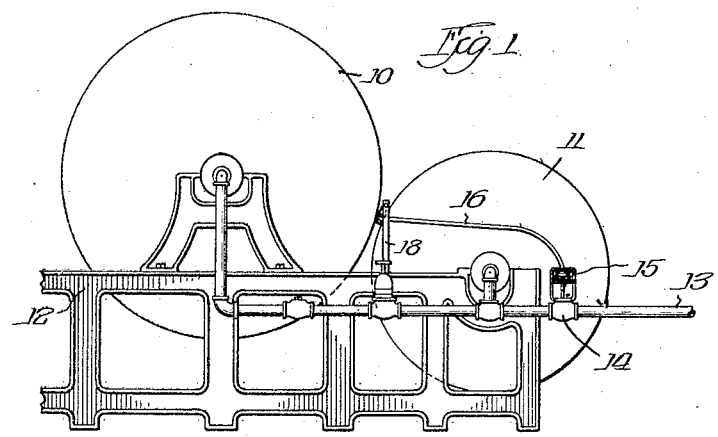
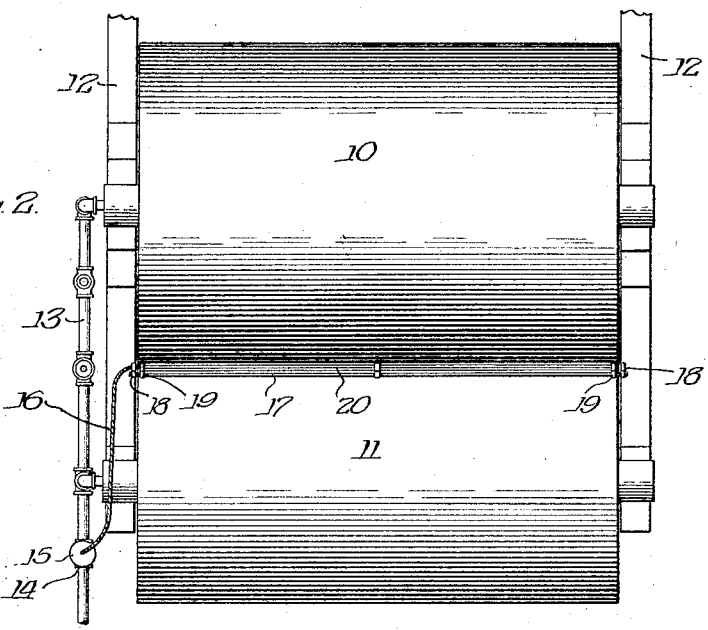
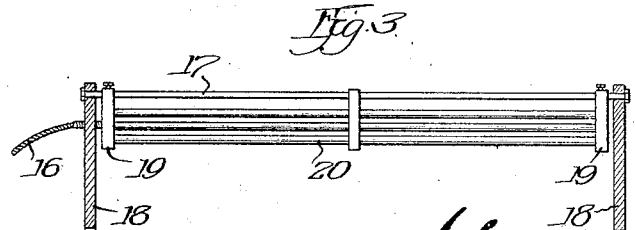

Patented May 20, 1924.

1,494,603

UNITED STATES PATENT OFFICE.

JOHN DARGAN JONES AND JOSEPH LEE WEST, OF BUFFALO, SOUTH CAROLINA, ASSIGNORS TO THE POWERS REGULATOR COMPANY, OF CHICAGO, ILLINOIS, A CORPORATION OF ILLINOIS.

SLASHER-CYLINDER HEAT-REGULATING MEANS.

Application filed April 23, 1923. Serial No. 633,988.

*To all whom it may concern:*

Be it known that we, JOHN D. JONES and JOSEPH L. WEST, citizens of the United States, and residents of Buffalo, in the county of Union and State of South Carolina, have invented certain new and useful Improvements in a Slasher-Cylinder Heat-Regulating Means, of which the following is a specification.

Our invention relates to heat control devices and particularly to a novel application of such devices to the control of the heat in slasher cylinders.

Slasher cylinders are utilized for the purpose of removing the moisture from yarns in the process of manufacture or treatment, the yarns being passed over and around the cylinders and being dried in their travel. It is obviously necessary to avoid wide variations in the temperature of the cylinders over which the yarns are passed and it is furthermore desirable that the temperature of the two cylinders be substantially uniform.

We are aware that means have been heretofore devised for thermostatically controlling the supply of heat to cylinders, such means comprising a thermostatic element shaped to conform to the periphery of the cylinder and arranged in contact therewith or in close proximity thereto, the thermostatic element being of small size and being affected by the temperature of but one portion of the cylinder. This arrangement may operate satisfactorily where the cylinder temperature is uniform from end to end thereof but in slasher cylinders this condition is not present. As the wet or damp yarns are passed around the cylinder the moisture is driven therefrom and the amount of moisture removed determines the quantity of heat withdrawn from the cylinder. Therefore a greater quantity of heat is withdrawn from one point of the cylinder than another.

In our construction the thermostatic element is placed between two cylinders, the peripheries of which are adjacent to but out of contact with each other and extends throughout the full width thereof. By means of this construction we are able to secure the differential of the temperatures in the two cylinders.

In order to overcome certain other objections we provide a self-contained heat controlling unit comprising a thermostatic element adapted to contain a volatile liquid, a flexible tube, and a bellows adapted to be affected by the vapor generated in the thermostatic element, the bellows operating a steam supply valve, the thermostatic element being located at a point between and at the point of closest approach of the two cylinders.

The invention will be more readily understood by reference to the accompanying drawing, in which:

Figure 1 is a side elevation of a thermostatic controlling device as applied to a pair of slasher cylinders;

Figure 2 is a plan view thereof; and

Figure 3 is an enlarged side elevation of the thermostatic element employed.

In the drawing it will be seen that a pair of cylinders 10, 11, are mounted on suitable bearings carried by a frame 12. The axis of rotation of the cylinder 10 is considerably above that of the cylinder 11. Steam is supplied through a pipe 13 and enters the cylinders through their axes. Means (not shown) may be provided for preventing the retention of water of condensation in the cylinders. A valve 14 controls the supply of steam, the valve being actuated by a diaphragm or bellows, indicated generally at 15, the bellows being operated by a thermostatic element connected thereto by a flexible tube 16. The thermostatic element, as shown in Figure 3, is of a length substantially equal to the length of the cylinders and is supported on a rod 17 carried by brackets 18 fixed to the frame 12. The element comprises headers 19 and three relatively small tubes 20 fixed at their ends in the headers. The flexible tube 16 terminates in one of the headers. By means of the tube construction, a relatively large area is presented and the required volume of thermostatic volatile liquid may be exposed thereby. Furthermore the tubes lend themselves to the required narrow construction to accommodate the thermostatic element between the closely adjacent peripheries of the two cylinders. The location of the element at the described point assures the supply of heat relative to the mean temperature of the cylinders.

One of the particular points of advantage in the proposed construction is that of the self-contained character of the thermostatic device, no air pressure or other external motive force being required for operation.

While it is not essential that the thermostatic element extend from end to end of the cylinders, we have preferred this construction; neither is it essential that the exact location of the element be followed. Variations in these and other features may be made without departure from the spirit of our invention.

We claim:

1. In means of the class described, the combination of a pair of cylinders, a self-contained regulator comprising a diaphragm for operating a heat controlling valve, a thermostatic element, and a tube connecting the element with the diaphragm whereby a change of pressure in the thermostatic element effects operation of the valve, said thermostatic element being located between and closely adjacent to said cylinders.

2. In means of the class described, the combination of a pair of cylinders, a self-contained regulator comprising a diaphragm for operating a heat controlling valve, a thermostatic element, and a tube connecting the element with the diaphragm whereby a change of pressure in the thermostatic element effects operation of the valve, said thermostatic element being relatively long and being arranged between and exteriorly of said cylinders.

3. In means of the class described, the combination of a pair of cylinders, a self-contained regulator comprising a diaphragm for operating a heat controlling valve, a thermostatic element, and a tube connecting the element with the diaphragm whereby a change of pressure in the thermostatic element effects operation of the valve, said thermostatic element being located adjacent to the point of closest approach of the cylinder peripheries to each other.

4. In a device of the class described, the combination of a pair of non-cooperating and non-contacting cylinders, a pipe for supplying heat to said cylinders, a valve controlling the passage of heat through said pipe, a fluid pressure diaphragm for moving said valve, a thermostatic element adapted to contain a volatile liquid, a flexible tube connecting the thermostatic element to the valve operating diaphragm, said thermostatic element being located at a point exteriorly of, between and closely adjacent to said cylinders in position to be affected by the differential of the temperatures in the two cylinders.

5. In a device for regulating the temperature of slasher cylinders, the combination of a valve for controlling the supply of heating fluid to the cylinders, a thermostatic element located exteriorly of the cylinders and between the same in position to be affected by the mean temperature thereof, and means connecting said thermostat to said valve.

6. In a device of the class described the combination of a pair of cylinders, a thermostat located exteriorly of and closely adjacent to the point of closest approach of the peripheries of the cylinders to each other, a valve for controlling the supply of heating fluid to the cylinders, and means connecting the thermostat to said valve.

7. In means of the class described, the combination with slasher cylinders and a valve controlling the supply of heating fluid thereto, of a thermostatic tube located between said cylinders and at substantially the point of closest approach of the peripheries thereof to each other, and means connecting the thermostatic tube to said valve.

8. In means for controlling the supply of heating fluid to slasher cylinders according to the mean temperature at a point between said cylinders, the combination with the cylinders of a thermostatic element comprising a plurality of tubes and a header, a valve, and means connecting said thermostatic element to said valve for operating the same.

Signed at Buffalo, S. C., this 7th day of April, 1923.

JOHN DARGAN JONES.
JOSEPH LEE WEST.